United States Patent
Dorrer et al.

(10) Patent No.: US 7,006,230 B2
(45) Date of Patent: Feb. 28, 2006

(54) INTERFEROMETRIC METHOD AND APPARATUS FOR THE CHARACTERIZATION OF OPTICAL PULSES

(75) Inventors: Christophe J. Dorrer, Matawan, NJ (US); Inuk Kang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 348 days.

(21) Appl. No.: 10/439,828

(22) Filed: May 16, 2003

(65) Prior Publication Data

US 2004/0227949 A1 Nov. 18, 2004

(51) Int. Cl.
*G01B 9/02* (2006.01)
(52) U.S. Cl. ..................... 356/451; 356/450
(58) Field of Classification Search ........... 356/450, 356/451
See application file for complete search history.

(56) References Cited

U.S. PATENT DOCUMENTS

| | | | |
|---|---|---|---|
| 6,728,436 B1 * | 4/2004 | Liu et al. ............... | 385/24 |
| 2004/0218930 A1 * | 11/2004 | Dorrer et al. .......... | 398/188 |

OTHER PUBLICATIONS

Lepetit, Cheriaux, and Joffre. "Linear techniques of phase measurement by femtosecond spectral interferometry for applications in spectroscopy" Dec. 1995. Journal of the Optical Society of America B 12, 2467-2474.*
Dorrer and Kang. "Highly sensitive direct characterization of femtosecond pulses by electro-optic spectral shearing interferometry" Mar. 15, 2003. Optics Letters 28, 477-479.*
Walmsey and Wong. "Analysis of ultrashort pulse-shpae measurement using linear interferometers" Feb. 15, 1994. Optics Letters 19, 287-289.*
SPIDER References. Universtiy of Oxford Website. http://ultrafast.physics.ox.ac.uk/spider/refs.html.*
"Analysis of Ultrashort Pulse-Shape Measurement Using Linear Interferometers", V. Wong and I. A. Walmsley, Optics Letters, vol. 19, No. 4, Feb. 15, 1994, p. 287-289.

* cited by examiner

*Primary Examiner*—Hwa Andrew Lee
*Assistant Examiner*—Patrick Connolly

(57) ABSTRACT

A method and apparatus for the characterization of an optical pulse includes splitting an optical pulse into two replicas separated by a delay, modulating at least one of the two replicas with a linear temporal phase modulation, measuring a spectrum of the modulated replicas, and characterizing the optical pulse using the measured spectra. In one embodiment of the present invention a spectral phase difference between the replicas is obtained from the measured spectrum using Fourier Transform Spectral Interferometry.

34 Claims, 7 Drawing Sheets

INTERFEROMETRIC METHOD AND APPARATUS FOR THE CHARACTERIZATION OF OPTICAL PULSES

FIELD OF THE INVENTION

This invention relates to the characterization of short optical pulses and, more specifically, to the application of spectral shearing interferometry for the characterization of short optical pulses.

BACKGROUND OF THE INVENTION

In optical communications systems, it is necessary to characterize the phase and amplitude of optical pulses as accurately as possible in order to predict and mitigate signal degradation. For example, in long distance wavelength-division multiplexed (WDM) systems optical signals may suffer degradation resulting from nonlinear effects such as self-phase modulation or cross-phase modulation.

As the need for information increases, so does the demand for higher speed and higher capacity communication systems. Higher speed communication systems require shorter optical pulses for transmission at higher bit rates (e.g., approximately 8 ps pulses for 40 Gb/s systems), and optical components with a picosecond response time or faster to process higher bit rate optical signals.

Techniques for the time-frequency analysis of the electrical field of a short optical pulse typically require a non-stationary filter element capable of modulating the amplitude and phase of the pulse on a time scale of the order of its duration. In the domain of femtosecond pulses, these techniques are generally realized using the nonlinear interaction of the short pulse to be characterized with one or several other short pulses in a quasi-instantaneous nonlinear medium. These nonlinear interactions require nonlinear optics which require fairly intense pulses. As such, these nonlinear techniques are impractical for low power applications such as telecommunication systems, which typically have peak powers as low as 0.1 mW or less. Various short pulse characterization techniques have been classified according to the way the information about the electric field is encoded in the experimental trace. For example, interferometric techniques directly measure the phase difference between a pair of optical frequencies in the spectral support of the pulse. Although various interferometric techniques have been demonstrated, Spectral Phase Interferometry for Direct Electric-field Reconstruction (SPIDER) is typically the most popular technique. SPIDER is a version of spectral shearing interferometry that relies on nonlinear optics. In SPIDER, a relative spectral shear between two replicas of a field under test is achieved by frequency mixing two time-delayed replicas of the pulse with a chirped pulse in a nonlinear optical crystal. However, the low efficiency of the nonlinear frequency conversion limits the sensitivity of SPIDER, as it does for all pulse characterization techniques based on nonlinear optics. Furthermore, the temporal support of the pulses that can be accurately characterized using SPIDER is also limited. SPIDER is also a free-space technology, and is accordingly impractical in the constraining environment of optical telecommunication. There is thus a need for more practical approaches to interferometric pulse characterization, for example using waveguide technology to implement interferometers and temporal phase modulators.

SUMMARY OF THE INVENTION

The present invention advantageously provides novel interferometric methods and apparatus for the characterization of optical pulses.

In one embodiment of the present invention, a method for the characterization of optical pulses includes splitting an optical pulse into two replicas separated by a delay, modulating the two replicas with a periodic phase modulation having a period substantially equal to twice the delay between the replicas such that each of the replicas experiences a linear temporal phase modulation, measuring a spectrum of the modulated replicas, and characterizing the optical pulse using the measured spectra. In one embodiment of the present invention, a spectral phase difference between the two sheared replicas is obtained from the measured spectrum using Fourier Transform Spectral Interferometry.

In another embodiment of the present invention, a method of calibration of the linear spectral phase difference attributable to the delay between two replicas of a pulse includes modulating at least one of the replicas with linear temporal phase modulation, measuring a first spectrum of the two interfering replicas after modulation and determining a first spectral phase difference between the replicas from the first spectrum. The method further includes modulating at least one of the two replicas such that at least one of the replicas experiences linear temporal phase modulation of a different slope, measuring a second spectrum of the two interfering replicas after modulation, determining a second spectral phase difference between the two interfering replicas from the second spectrum, and determining and eliminating a linear spectral phase difference between the two replicas attributable to the delay by comparing the two determined spectral phase differences.

In another embodiment of the present invention, an apparatus for characterizing an optical pulse includes a waveguide interferometer for splitting the optical pulse into two replicas separated by a delay, at least one waveguide temporal phase modulator for modulating at least one of the replicas, and a frequency-resolving device for measuring a spectrum of said modulated replicas, wherein the at least one replica is modulated with a linear temporal phase modulation. The apparatus, alternatively, further includes a control unit for characterizing the optical pulse using the measured spectra. In one embodiment of the present invention, Fourier Transform Spectral Interferometry is used to determine a spectral phase difference between the two sheared replicas.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
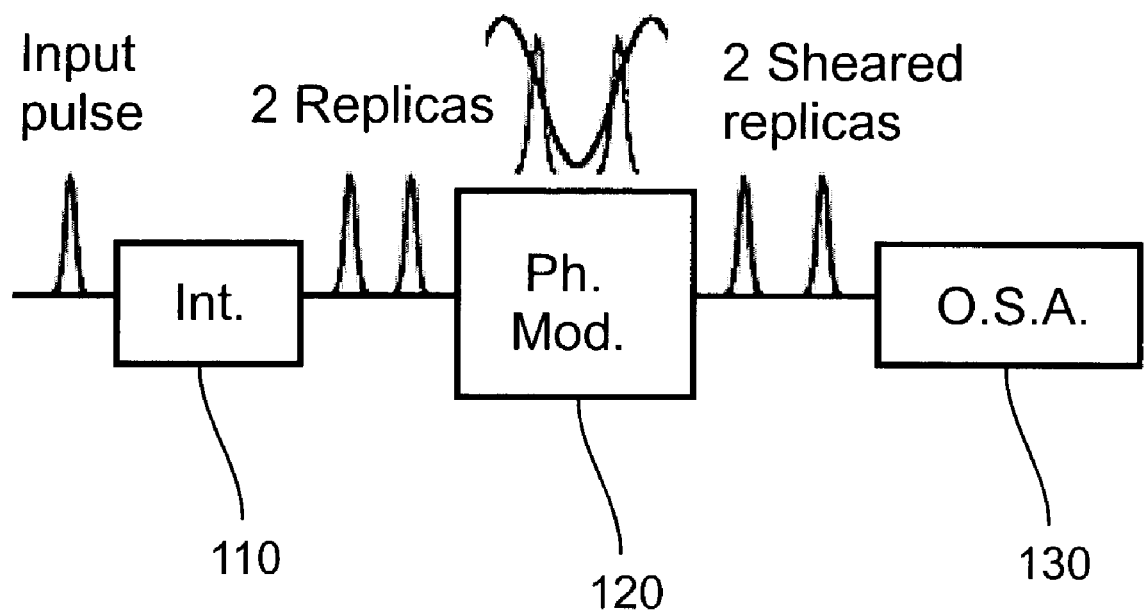
FIG. 1 depicts a high level block diagram of one embodiment of a pulse characterization system in accordance with the present invention.

The present invention advantageously provides a method and apparatus for the fast, highly sensitive characterization of optical pulses. Although embodiments of the present invention will be depicted utilizing Mach-Zehnder interferometers, it will be appreciated by those skilled in the art and informed by the teachings of the present invention, that various other embodiments of the present invention may be developed implementing various other components for accomplishing the optical shearing of the present invention.

The inventors propose a linear technique for the characterization of optical pulses via the implementation of shearing interferometry and the use of a temporal phase modulator. The complete characterization of an optical pulse, represented as $\tilde{E}(\omega)=\sqrt{I(\omega)}\exp[i\phi(\omega)]$, may be obtained using independent measurements of the spectral density $I(\omega)$ and the spectral phase $\phi(\omega)$. Spectral shearing interferometry directly measures the spectral phase from a gradient of the phase. This is performed by interfering the pulse $\tilde{E}(\omega)$ with a replica of the same pulse sheared by $\Omega$ along the frequency axis, i.e. $\tilde{E}(\omega-\Omega)$. The measurement of the interferometric component yields $\sqrt{I(\omega)}\sqrt{I(\omega-\Omega)}\exp[i[\phi(\omega)-\phi(\omega-\Omega)]]$, whose argument is the phase difference $\phi(\omega)-\phi(\omega-\Omega)$. The amount of shear $\Omega$ needs to be small enough such that the sampling of the spectral field at the frequency $\Omega$ faithfully describes the field, but large enough so that the finite difference $\phi(\omega)-\phi(\omega-\Omega)$ is measured accurately for phases that significantly affect the pulse shape. A rule of thumb is to have a shear of the order of 5% of the spectral bandwidth of the train of optical pulses under test, but this value depends on the signal-to-noise ratio of the interferogram.

The extracted phase difference $\phi(\omega)-\phi(\omega-\Omega)$ is approximately $$\Omega\frac{\partial\varphi}{\partial\omega},$$

which can be integrated to yield $\phi(\omega)$. Alternatively, the spectral phase $\phi(\omega)$ can be reconstructed by concatenation of the phase difference $\phi(\omega)-\phi(\omega-\Omega)$, i.e., setting the phase equal to 0 at some arbitrary point in the spectrum and reconstructing the phase successively at points separated by $\Omega$ using the quantity $\phi(\omega)-\phi(\omega-\Omega)$. The two interfering pulses are separated by a delay $\tau$ larger than the coherence time of the pulse, such that Fourier Transform Spectral Interferometry may be used to directly extract the interferometric component. Although Fourier Transform Spectral Interferometry is a convenient way of extracting the phase difference between the two sheared replicas, it will be appreciated by those skilled in the art, informed by the teachings of the present invention, that other experimental or mathematical techniques that leads to the same result may be used.

FIG. 1 depicts a high level block diagram of one embodiment of a pulse characterization system in accordance with the present invention. The pulse characterization system 100 of FIG. 1 comprises a waveguide interferometer (illustratively a Mach-Zehnder Interferometer) 110, a waveguide temporal phase modulator (illustratively a $LiNbO_3$ temporal phase modulator) 120, and an optical frequency-resolving device (illustratively an optical spectrum analyzer) 130. The pulse characterization system 100 is capable of being constructed of all-fiber based components (i.e., waveguide technology). Although the optical frequency-resolving device in FIG. 1 is depicted as an optical spectrum analyzer, other optical frequency-resolving devices comprising similar operating features, such as a Fabry-Perot etalon followed by a photodetector, may be implemented within the present invention.

In the pulse characterization system 100 of FIG. 1, an optical pulse under test is input to the Mach-Zehnder interferometer 110, which generates two replicas of the pulse separated by a delay $\tau$. The two replicas are then communicated to the temporal phase modulator 120, which is, for example, driven by a periodic RF drive voltage, preferably a sine wave with a period equal to twice the delay between the two replicas. In the temporal phase modulator 120, proper synchronization is implemented such that the two replicas are temporally aligned with alternate zero crossings of the drive voltage of the phase modulator. That is, a proper adjustment of the delay between the RF sine wave and the two replicas of the optical pulse under test leads to one of the replicas of the optical pulse being modulated by a linear temporal phase modulation of positive slope (negative spectral shear $-\Omega$) and the other by a linear temporal phase modulation of negative slope (positive spectral shear $+\Omega$). (It should be noted that within the concepts of the present invention, it is not critical which replica of the optical pulse experiences a linear temporal phase modulation of positive slope and which replica of the optical pulse experiences a linear temporal phase modulation of negative slope.) As such, the pulses are spectrally sheared by the same amount, but in opposite directions. The above configuration ensures that the two pulse replicas experience the same dispersion (except for the path difference in the Mach-Zehnder interferometer 110, which is negligible) along the propagation.

In the embodiment of FIG. 1, the frequency of the modulation of the temporal phase modulator 120 is a multiple of the repetition rate of the optical train of pulses under test. Typically, in telecommunication systems, a master clock used for the generation of a train of optical pulses is readily available for providing a driving signal for the phase modulation of the temporal phase modulator 120. If no such electrical clock is readily available, a clock recovery circuit can be implemented to extract the driving signal for the phase modulation of the temporal phase modulator 120. More specifically, an electronic clock signal may be recovered from the optical pulses and a harmonic of said electronic clock is used to drive said phase modulator. The timing alignment between the two pulse replicas and the phase modulation of the temporal phase modulator 120 is adjusted such that the two replicas from the Mach-Zehnder interferometer 110 are at the zero-crossings of the phase modulation as depicted in FIG. 1.

The timing alignment is accomplished by blocking one of the arms of the Mach-Zehnder interferometer 110 and tracking the centroid of the spectrum of the remaining of the two replicas as a function of the timing offset between the remaining replica and the driving signal for the temporal phase modulator 120 if it is practical to do so.

In an alternate embodiment of the present invention where application of the above mentioned calibration is impractical, the timing alignment of the present invention is accomplished by sending the output of the temporal phase modulator 120 into a dispersive fiber and monitoring the delay $\tau$ between the two replica pulses on a fast sampling scope. The two replicas experience different average group delays in the fiber because of their relative shear. Extrema of the maximum delay between the two replica pulses are obtained when the magnitude of the relative shear is maximal, which occurs when the two replica pulses are at the zero-crossings of the phase modulation as described above and depicted in FIG. 1. This configuration allows for the calibration of the shear using the second order dispersion of the fiber and the measurement of the maximum delay between the two sheared replicas. The output of the modulator is composed of two replicas of the pulse under test separated by the delay $\tau$, and spectrally sheared by $\Omega$ and $-\Omega$. The spectral phase difference between the two replicas is then extracted and leads to $$\varphi(\omega + \Omega) - \varphi(\omega - \Omega) + \omega \cdot \tau = 2\Omega \frac{\partial \varphi}{\partial \omega} + \omega \cdot \tau.$$

After removal of the linear term $\omega \cdot \tau$, the phase gradient $$\frac{\partial \varphi}{\partial \omega}$$

is integrated to yield $\phi(\omega)$.

More specifically, the extraction of the spectral phase difference between the two electric fields $\tilde{E}_1(\omega) = \sqrt{I_1(\omega)} \exp(i\phi_1(\omega))$ and $\tilde{E}_2(\omega) = \sqrt{I_2(\omega)} \exp(i\phi_2(\omega))$ is accomplished using Fourier Transform Spectral Interferometry. The interferogram output of the temporal phase modulator 120 measured by the optical spectrum analyzer 130 is characterized as $|\tilde{E}_1(\omega) + \tilde{E}_2(\omega) \exp(i\omega \cdot \tau)|^2 = I_1(\omega) + I_2(\omega) + 2|\tilde{E}_1(\omega)||\tilde{E}_2(\omega)|\cos[\phi_2(\omega) - \phi_1(\omega) + \omega \cdot \tau]$. The presence of the term $\omega \cdot \tau$ in the interferometric component leads to quickly varying fringes. As is well known in the art, extraction of the phase difference between the two fields is performed by Fourier transforming the interferogram, filtering the components that correspond to the period of the quickly varying fringes, and Fourier transforming back to the frequency domain. This operation extracts the component $|\tilde{E}_1(\omega)||\tilde{E}_2(\omega)| \exp[i(\phi_2(\omega) - \phi_1(\omega) + \omega \cdot \tau]$ exactly, and therefore allows the direct measurement of the phase difference $\phi_2(\omega) - \phi_1(\omega)$ between the two fields.

As mentioned above, before integrating the phase gradient and in order to obtain the phase of the pulse under test, the linear term $\omega \cdot \tau$ must be subtracted. A first method for the subtraction of the linear term $\omega \cdot \tau$ consists of interrupting the phase modulation of the two replicas. This may be accomplished by turning off the RF drive going to the temporal phase modulator 120. After the phase modulation is interrupted, the resulting interferogram is measured. In this case, there is no shear between the two interfering replicas, and the extracted phase difference is exactly $\omega \cdot \tau$. As such, this resulting phase may be used as a reference phase that may be subtracted from any further measurements.

Figure 2:
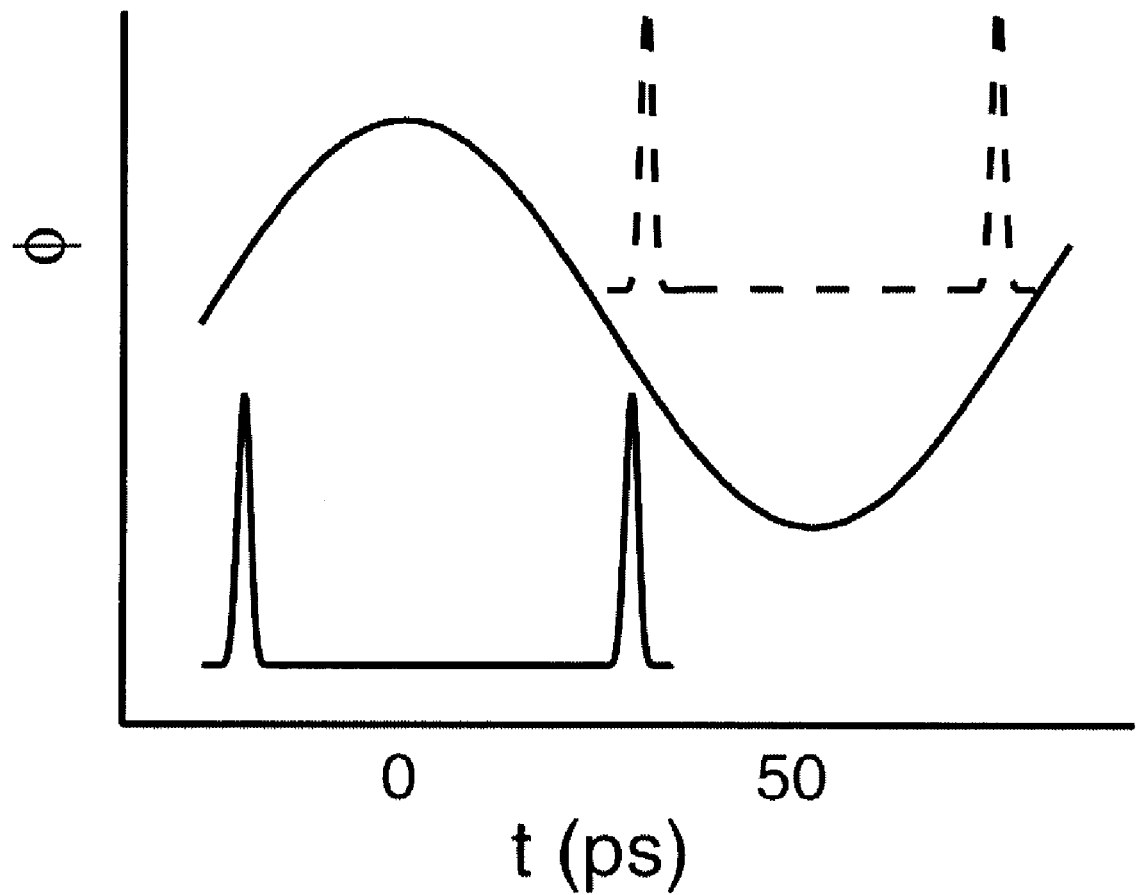
FIG. 2 graphically depicts two exemplary timing arrangements between the pulse replicas and the phase modulator drive voltage which facilitate the elimination of the linear phase term attributable to delay.

The inventors have determined a second, inventive method for the subtraction of the linear term $\omega \cdot \tau$ as schematically depicted in FIG. 2. FIG. 2 graphically depicts two exemplary timing arrangements between the pulse replicas and the phase modulator drive voltage, which facilitate the elimination of the linear phase term $\omega \cdot \tau$ attributable to the delay. This inventive method consists of the measurement of two interferograms for two different timing alignments between the replicas and the phase modulator driving voltage. More specifically, the RF drive for the temporal phase modulator 120 and the two replicas are first synchronized such that a first of the two replicas is modulated by a linear temporal phase modulation of positive slope, and therefore leads to the electric field $\tilde{E}(\omega - \Omega)$, and the second replica (which is delayed by $\tau$, i.e. half the period of the modulation) is modulated by a linear temporal phase modulation of negative slope, and therefore leads to the electric field $\tilde{E}(\omega + \Omega)$ as depicted in FIG. 2. In this manner, the extracted phase difference is $\phi(\omega - \Omega) - \phi(\omega + \Omega) + \omega \cdot \tau$. The synchronization is then modified such that the first of the two replicas is modulated by a linear temporal phase modulation of negative slope and the second replica is modulated by a linear temporal phase modulation of positive slope. In this case, the extracted phase difference is $\phi(\omega + \Omega) - \phi(\omega - \Omega) + \omega \cdot \tau$. (It should be noted that within the concepts of the present invention, it is not critical which replica of the optical pulse experiences a linear temporal phase modulation of positive slope first and which replica of the optical pulse experiences a linear temporal phase modulation of a positive slope second or vice versa.) The resultant difference of the two measured spectral phase differences is $$2 \cdot [\varphi(\omega + \Omega) - \varphi(\omega - \Omega)] \approx 4\Omega \frac{\partial \varphi}{\partial \omega}$$

and, as is evident, no longer contains the linear term $\omega \cdot \tau$. The switching between the two timing arrangements may be performed in substantially real time using a voltage controlled phase shifter. A benefit of this method consists of the fact that the measurements are made in substantially real time and as such, effects from any drift of the interferometer are minimized and the accuracy of the resultant characterization of the optical pulses is increased. In such an embodiment of the present invention, a fast Fabry-Perot etalon followed by a photodetector may be used for the measurement of the spectra to decrease the acquisition time and allow the measurements to be made in substantially real time.

In an experiment, the inventors validated the principles of the present embodiment using short optical pulses generated form a fiber-grating compressor. A master clock (5 GHz) was doubled and a semiconductor electro-absorption modulator (EAM) was driven under a negative voltage bias to carve a 10-GHz train of 15 ps pulses from a CW laser input. The repetition rate of the optical pulse train was then reduced to 156 MHz by gating the pulse train with another EAM driven by the master clock divided by 32. The train of pulses were amplified in an erbium-doped fiber amplifier (EDFA) to an average power of 40 mW (peak power=17 W) and propagated through a 400-m long highly nonlinear fiber with normal dispersion. The spectrum of the pulses was broadened to approximately 10 nm due to self phase modulation in the nonlinear fiber. The optical pulses were then compressed by a two-grating compressor down to approximately 750 fs. After compression, the optical pulses were propagated through a Mach-Zehnder waveguide interferometer.

The delay provided by the Mach-Zehnder waveguide interferometer was configured to be 100 ps and the modulation frequency was 5 GHz. At this frequency, the time window over which the modulation is linear is about 40 ps. With a peak-to-peak drive voltage of 14 V, a peak-to-peak phase modulation of ±4 radian was produced, corresponding to $2\Omega=2.45*10^{-4}$ $fs^{-1}$ (i.e. 0.3 nm), with a commercially available $LiNbO_3$ phase modulator. This corresponds to a spectral shear of approximately 3% of the bandwidth of the train of pulses under test.

Figure 3:
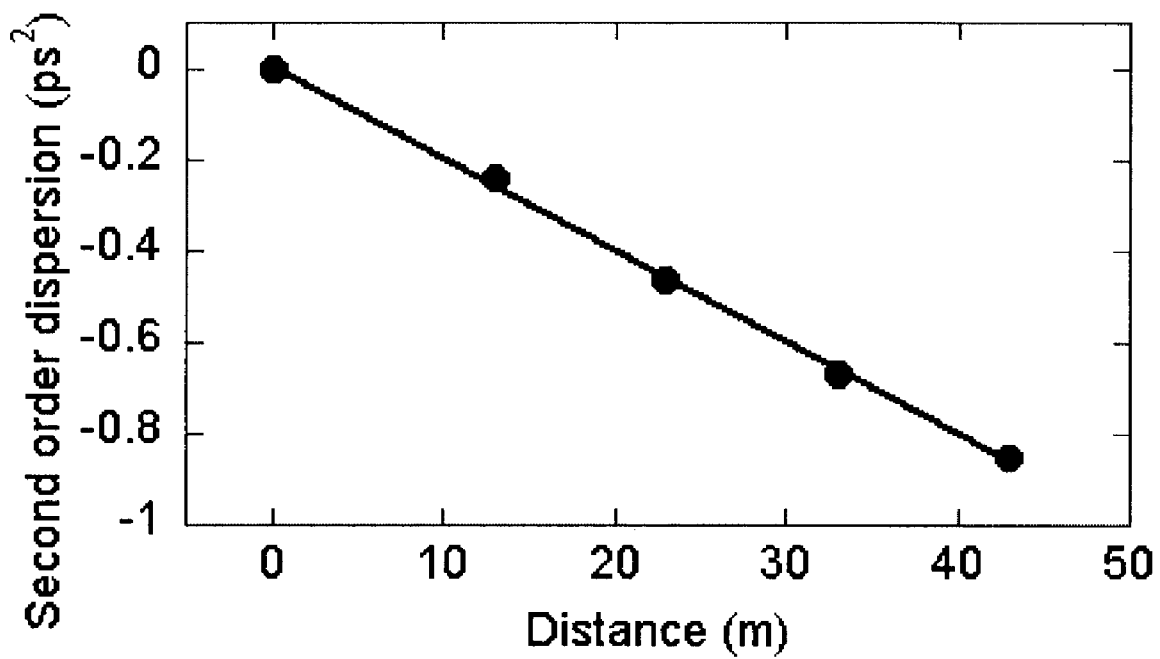
FIG. 3 graphically depicts a comparison of the expected values of second order dispersion to the measured values of second order dispersion obtained after propagation of a train of optical pulses through various lengths of standard single-mode fiber.

The linear electro-optic spectral shearing interferometry of the present invention is validated by characterizing the train of pulses before and after propagation through various lengths of standard single-mode fiber. FIG. 3 graphically depicts a comparison of the expected values of second order dispersion to the measured values of second order dispersion obtained after propagation of the train of optical pulses through various lengths of standard single-mode fiber. The second order dispersion measurement was performed by fitting the difference between the spectral phase of the train of optical pulses before and after propagation through various lengths of standard single-mode fiber. In FIG. 3, the values of second order dispersion (vertical axis) are plotted against the lengths of standard single-mode (horizontal axis). The expected values of the second order dispersion are depicted by a solid line curve on the graph of FIG. 3, and the measured values of second order dispersion for the train of optical pulses are depicted by a dotted curve.

As evident from FIG. 3, excellent agreement between the expected and measured values of second order dispersion is obtained. FIG. 3 illustrates the accurate characterization of optical pulse of various durations (e.g., 750 fs before propagation through the standard single-mode fiber, and 5 ps, after propagation through 43 meters of the standard single-mode fiber).

Figure 4:
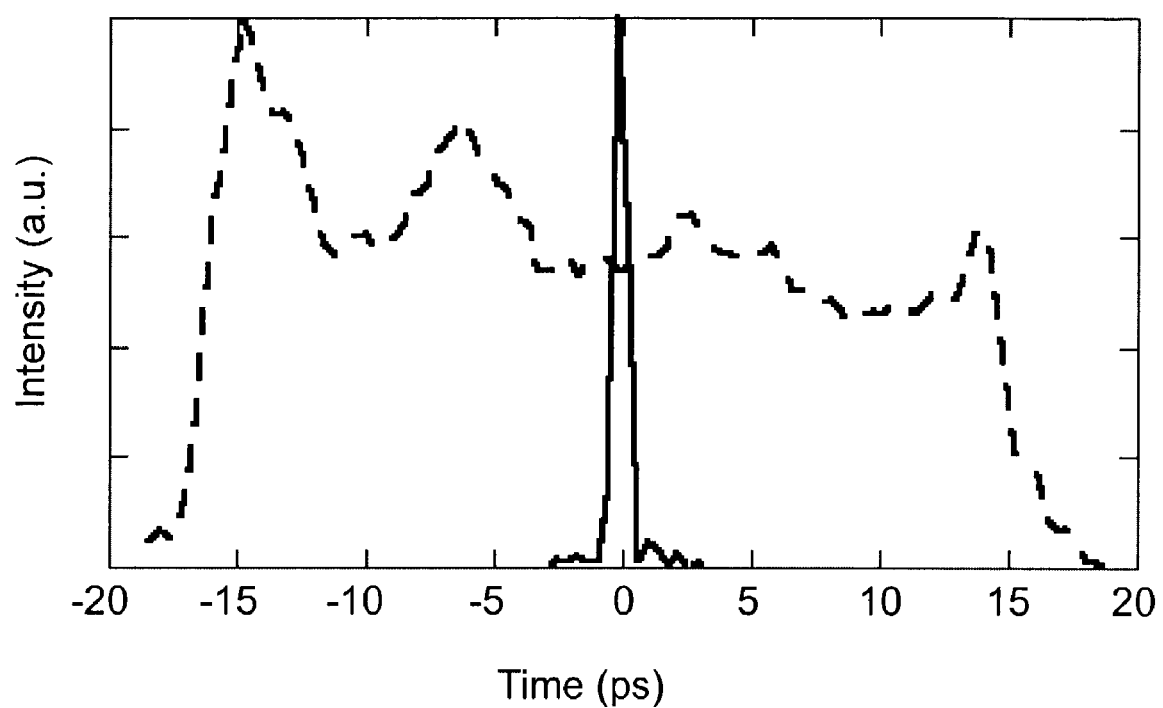
FIG. 4 graphically depicts the temporal intensity of a train of optical pulses before and after the pulses are compressed by a two-grating compressor.

Another demonstration of the wide range of the measurable pulse durations in accordance with the present invention is depicted in FIG. 4. FIG. 4 graphically depicts the temporal intensity of the train of optical pulses before and after the pulses are compressed. The temporal intensity of the train of optical pulses before compression by the two-grating compressor are depicted by a dotted line curve on the graph of FIG. 3, and the temporal intensity of the train of optical pulses after compression by the two-grating compressor are depicted by a solid line curve.

Before compression, an optical pulse is more than 30 ps long, about 40 times the Fourier-Transform limit, yet the optical pulse is still fully and accurately characterized. After compression, the optical pulse is 750 fs long and is characterized just as accurately using the concepts of the present invention. The extracted second order dispersion of the two-grating compressor, $-3.62$ $ps^2$ agreed well with the calculated value of $-3.84$ $ps^2$.

Figure 5:
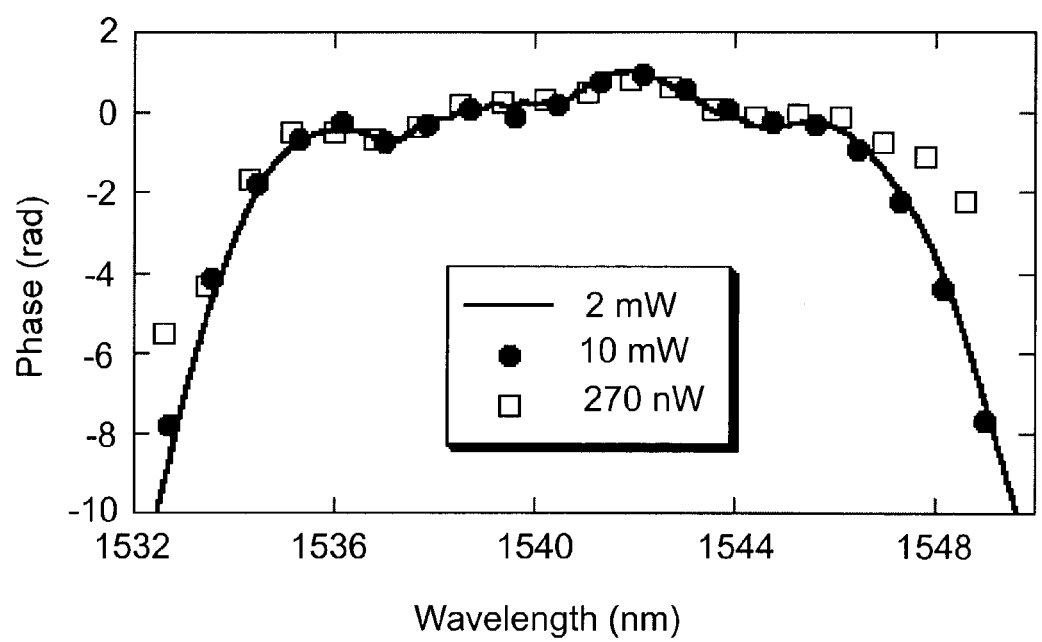
FIG. 5 graphically depicts the characterization of a train of optical pulses for three different signal powers.

A test of the sensitivity of the characterization of a train of optical pulses in accordance with the concepts of the present invention was performed by characterizing a train of optical pulses at an average power of 2 mW, then decreasing the average power to 10 $\mu W$ and subsequently to 270 nW, each time performing the characterization. FIG. 5 graphically depicts the recovered phases for the three different powers of the train of optical pulses. In FIG. 5, the phase of the train of optical pulses is depicted in the vertical axis and the wavelength of the train of optical pulses are depicted in the horizontal axis. The recovered phases for the train of optical pulses for the three different powers are in good agreement for the optical frequencies where the pulses have sufficient spectral intensity. The achieved sensitivity for the characterization of optical pulses in accordance with the present invention is of the order of 10000 times better than the sensitivity of a comparable, conventional Spectral Phase Interferometry for Direct Electric-field Reconstruction (SPIDER) system.

Figure 6:
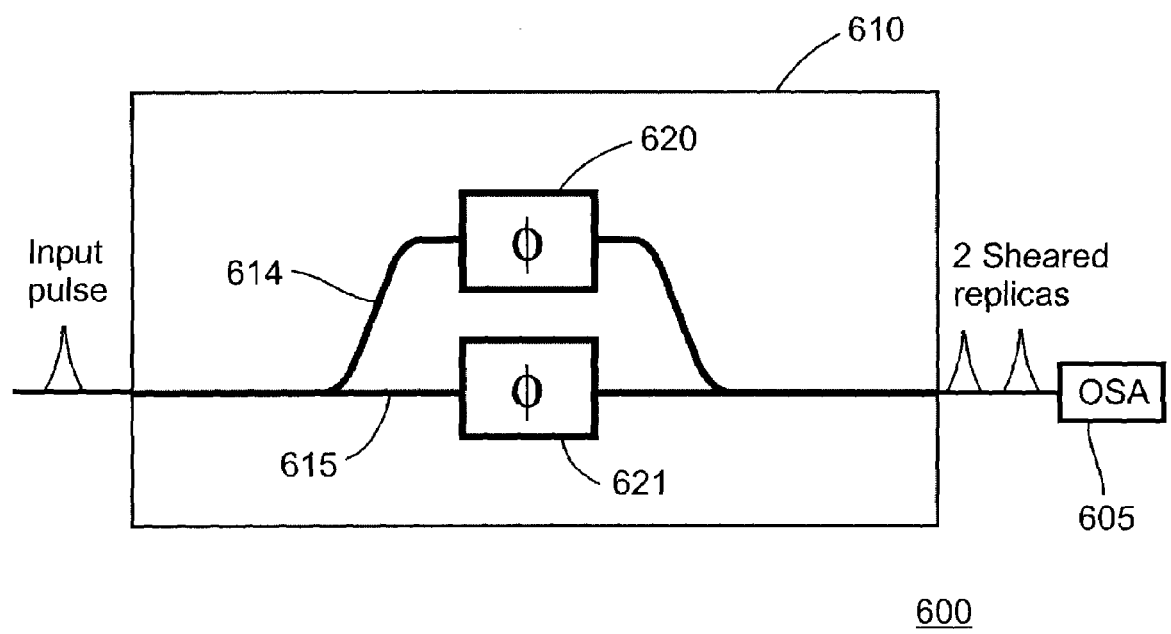
FIG. 6 depicts a high level block diagram of an alternate embodiment of a pulse characterization system in accordance with the present invention.

FIG. 6 depicts a high level block diagram of an alternate embodiment of a pulse characterization system in accordance with the present invention. The pulse characterization system 600 of FIG. 6 comprises a waveguide device integrating the functionalities of the interferometer and the phase modulator of the previous embodiments. The pulse characterization system 600 of FIG. 6 comprises also comprises a frequency-resolving device (illustratively, an OSA) 605. The waveguide device 610 of the pulse characterization system 600 of FIG. 6 comprises two waveguide arms 614, 615 and two temporal phase modulators, 620, 621, respectively. An input optical pulse under test is split into two replicas and each of the replicas is modulated.

More specifically, an input optical pulse under test is coupled into the waveguide device 610 that first splits the incoming optical pulse into two replicas, each of the replicas propagating along one waveguide arm 614, 615. Each waveguide arm 614, 615 comprises a temporal phase modulator 620, 621 that spectrally shears the replica propagating through it. Each modulator 620, 621 is driven such that the corresponding pulse is coincident with linear temporal phase modulation in order to provide a spectral shear as described above for the first embodiment of the invention. Note that in this embodiment, the delay between the two interfering replicas can be set independently from the period of the RF drives provided to the temporal phase modulators.

In the embodiment of FIG. 6, however, a different RF drive (not shown) may be used for each phase modulator 620, 621, therefore leading to respective shear $\Omega_1$ and $\Omega_2$. The frequency-resolving device 605 measures an interferogram, as in the previous embodiment, from which the spectral phase difference $\phi(\omega-\Omega_1)-\phi(\omega-\Omega_2)+\omega\tau$ is extracted, for example, using Fourier Transform Spectral Interferometry. As before, the linear term attributable to the delay $\omega\tau$ must be removed in the processing. This may be accomplished as described above for the first embodiment of the present invention. That is, the RF drive signal sent to the two phase modulators 620, 621 may be turned off, which sets the spectral shears to zero. The measured spectral phase difference between the two replicas is then $\omega\tau$, which can be used as a calibration phase. As described above, another method of canceling the linear term $\omega\tau$ is by changing the timing alignment of the RF drives compared to the pulse. For example, a first interferogram is measured where the timing alignment leads to spectral shears $\Omega_1$ and $\Omega_2$. Subsequently, a second interferogram is measured where the timing alignments leads to spectral shears $-\Omega_1$ and $-\Omega_2$. The switching between the two timing arrangements is performed in substantially real time using voltage controlled phase shifters acting on the RF drives and adding a delay equal to half the period of the drive. Subtracting the spectral phase difference extracted from the first interferogram from the spectral phase difference extracted from the second interferogram leads to $\phi(\omega+\Omega_1)-\phi(\omega+\Omega_2)-\phi(\omega-\Omega_1)+\phi(\omega-\Omega_2)$. This may be approximated as a phase gradient $$2(\Omega_1 + \Omega_2)\frac{\partial \varphi}{\partial \omega},$$

which is integrated to yield the spectral phase of the pulse under test. Such a structure takes advantage of the inherent stability, compactness and polarization insensitivity of waveguides. More specifically, the path difference between the two arms of the interferometer is stable unlike the case in a free-space interferometer where external parameters such as air turbulence, temperature, and vibration perturb the path lengths of the interferometer. Using waveguide components also ensures that the polarization state of the two output replicas is identical, which ensures good interference, and therefore a good signal-to-noise ratio. The waveguide device 610 of FIG. 6 is very compact, and therefore may be easily integrated.

Figure 7:
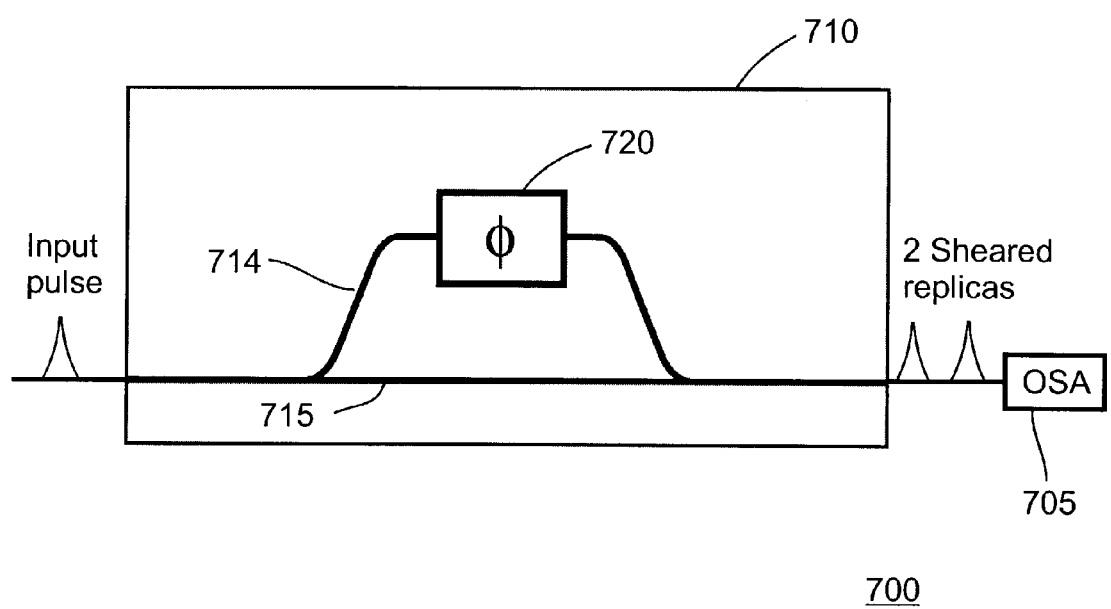
FIG. 7 depicts a high level block diagram of an embodiment of a waveguide interferometer with a temporal phase modulator in one arm.

FIG. 7 depicts a high level block diagram of another embodiment of a pulse characterization system in accordance with the present invention. The pulse characterization system 700 of FIG. 7 comprises a waveguide device 710 integrating the interferometry and phase modulation of the present invention and a frequency-resolving device (illustratively, an OSA) 705. The waveguide device 710 of the pulse characterization system 700 of FIG. 7 comprises two waveguide arms 714, 715 and a temporal phase modulator 720. An input optical pulse under test is split into two replicas and one of the replicas is modulated.

More specifically, an input optical pulse under test is coupled into the waveguide device 710 that first splits the incoming optical pulse into two replicas, each of the replicas propagating along one waveguide arm 714, 715. Illustratively, the upper waveguide arm 714 comprises the temporal phase modulator 720 that spectrally shears the replica propagating through it. Note that, as in the previous embodiment, the delay between the two interfering replicas may be set independently from the period of the RF drive to the temporal phase modulator. The modulator 720 is driven such that the corresponding pulse is coincident with linear temporal phase modulation. As such, the pulse is spectrally sheared by a quantity $\Omega$. The OSA 705 measures an interferogram, as in the previous embodiment, from which the spectral phase difference $\phi(\omega-\Omega)-\phi(\omega)+\omega\tau$ is extracted, for example using Fourier Transform Spectral Interferometry. Again, the linear term attributable to the delay $\omega\tau$ must be removed in the processing. This may be accomplished as described above for the first embodiment of the present invention. That is, the RF drive signal sent to the phase modulator 720 may be turned off, which sets the spectral shears to zero. The measured spectral phase difference between the two replicas is then $\omega\tau$, which can be used as a calibration phase. As described above, another method of canceling the linear term $\omega\tau$ is by changing the timing alignment of the RF drive compared to the replica propagating into the modulator 720. For example, a first interferogram is measured where the timing alignment leads to a positive spectral shear $\Omega$. Subsequently, a second interferogram is measured where the timing alignment leads to a negative spectral shear $-\Omega$. The switching between the two timing arrangements is performed in substantially real time using voltage controlled phase shifters acting on the RF drive and adding a delay equal to half the period of the drive. Subtracting the spectral phase difference extracted from the first interferogram from the spectral phase difference extracted from the second interferogram leads to $\phi(\omega+\Omega)-\phi(\omega-\Omega)$. This may be approximated as a phase gradient $$2\Omega\frac{\partial \varphi}{\partial \omega},$$

which can be integrated to yield the spectral phase of the pulse under test. As in the previous embodiments, the inherent stability, compactness and polarization insensitivity of waveguides provides a practical implementation for the concept of spectral shearing interferometry.

Furthermore, in accordance with the concepts of the present invention, any of the embodiments of the present invention may further comprise a controller for performing the mathematical operations on the resulting output of a pulse characterization system in accordance with the present invention. That is, a controller may be used to perform the Fourier Transform Spectral Interferometry, or other similar function, to extract the phase difference between the two sheared replicas and perform the characterization of an optical pulse under test. Such a controller may also be adapted to generate a delay signal to delay a modulator driver to achieve and perform the inventive calibration method of the present invention.

For example and referring back to FIG. 2, a controller may be implemented within the present invention to perform the subtraction of the linear term $\omega\cdot\tau$. More specifically, a controller may be implemented to perform the measurement of two interferograms for two different timing alignments between the replicas and the phase modulator driving voltage by generating a delay in a modulator driver such that the two replicas are first synchronized such that the first replica is modulated by a linear temporal phase modulation of positive slope and the second replica is modulated by a linear temporal phase modulation of negative slope and subsequently such that the first replica is modulated by a linear temporal phase modulation of negative slope and the second replica is modulated by a linear temporal phase modulation of positive slope. The resultant difference of the two measured spectral phase differences is $$2\cdot[\varphi(\omega+\Omega)-\varphi(\omega-\Omega)] \approx 4\Omega\frac{\partial \varphi}{\partial \omega}$$

and, as is evident, no longer contains the linear term $\omega\cdot\tau$. The switching between the two timing arrangements may be performed in substantially real time using a voltage controlled phase shifter.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   splitting an optical pulse into two replicas separated by a delay;
   modulating said two replicas with a periodic phase modulation having a period substantially equal to twice the delay between the replicas such that each of the replicas experiences a linear temporal phase modulation;
   measuring a spectrum of said modulated replicas; and characterizing said optical pulse using said measured spectra.

2. The method of claim 1, wherein said spectra are measured using an optical spectrum analyzer.

3. The method of claim 1, wherein said spectra are measured using a Fabry-Perot etalon followed by a photodetector.

4. The method of claim 1, wherein one of said replicas is modulated by a linear temporal phase modulation of positive slope and the other of said replicas is modulated by a linear temporal phase modulation of negative slope.

5. The method of claim 1, wherein a clock signal is coupled to an optical source generating said optical pulse and to a modulator driver of said modulator for synchronization.

6. The method of claim 1, wherein an electronic clock signal is recovered from the optical pulses and a harmonic of said electronic clock is used to drive said phase modulator.

7. The method of claim 1, wherein a spectral phase difference between the two replicas is determined from the measured spectrum using Fourier Transform Spectral Interferometry.

8. The method of claim 1, further comprising determining a linear spectral phase difference between the two replicas attributable to the delay, and subtracting said determined linear spectral phase difference from the measured spectral phase.

9. The method of claim 8, wherein the linear spectral phase difference between the two replicas attributable to the delay is determined by turning off the temporal modulation, measuring the spectral phase difference between the two replicas and subtracting the resultant spectral phase from the spectral phase measured for the replicas with the modulation on.

10. The method of claim 8, wherein the linear spectral phase difference between the two replicas attributable to the delay is determined by subtracting spectral phase differences obtained from two interferograms corresponding to two different timing alignment arrangements between the replicas and the phase modulator drive voltage.

11. The method of claim 10, wherein a first of said two replicas is modulated by a linear temporal phase modulation of positive slope and the second of said two replicas is modulated by a linear temporal phase modulation of negative slope, resulting in a first interferogram, and then the first of said two replicas is modulated by a linear temporal phase modulation of negative slope and the second of said two replicas is modulated by a linear temporal phase modulation of positive slope, resulting in a second interferogram.

12. The method of claim 10, wherein the switching between said two different timing alignments is achieved using a voltage controlled phase shifter that adjusts the phase of a phase modulator drive voltage.

13. The method of claim 10, wherein a first of said two replicas is modulated by a linear temporal phase modulation of negative slope and the second of said two replicas is modulated by a linear temporal phase modulation of positive slope, resulting in a first interferogram, and then the first of said two replicas is modulated by a linear temporal phase modulation of positive slope and the second of said two replicas is modulated by a linear temporal phase modulation of negative slope, resulting in a second interferogram.

14. A method for calibrating the linear spectral phase difference attributable to a temporal delay between two replicas of an optical pulse, comprising:
modulating said two replicas with a periodic phase modulation such that each of the replicas experiences a linear temporal phase modulation, and such that a first of said two replicas is modulated by a linear temporal phase modulation of first slope and the second of said two replicas is modulated by a linear temporal phase modulation of second slope;
measuring a first spectrum of said modulated replicas;
determining a first spectral phase difference between said modulated replicas from said first spectrum;
modulating said two replicas such that the first replica is modulated by a linear temporal phase modulation of the second slope and the second replica is modulated by a linear temporal phase modulation of the first slope,
measuring a second spectrum of said modulated replicas;
determining a second spectral phase difference between said modulated replicas from said second spectrum; and
determining and eliminating a linear spectral phase difference between said two replicas attributable to the delay by comparing said two determined spectral phase differences.

15. The method of claim 14, wherein said first slope is a positive slope and said second slope is a negative slope.

16. The method of claim 14, wherein said first slope is a negative slope and said second slope is a positive slope.

17. The method of claim 14, wherein the first of said two replicas experiences a linear temporal phase modulation of substantially zero slope, such that the first of said two replicas is effectively not modulated.

18. The method of claim 14, wherein the second of said two replicas experiences a linear temporal phase modulation of substantially zero slope, such that the second of said two replicas is effectively not modulated.

19. The method of claim 14, wherein said spectra are measured using an optical spectrum analyzer.

20. The method of claim 14, wherein said spectra are measured using a Fabry-Perot etalon followed by a photodetector.

21. The method of claim 14, wherein the spectral phase difference between the two modulated replicas is obtained from the measured spectrum using Fourier Transform Spectral Interferometry.

22. The method of claim 14, wherein a drive signal to a driver of a modulator is adjusted to cause said first of said two replicas to be modulated by a linear temporal phase modulation of positive slope and the second of said two replicas to be modulated by a linear temporal phase modulation of negative slope and then said first of said two replicas to be modulated by a linear temporal phase modulation of negative slope and the second of said two replicas to be modulated by a linear temporal phase modulation of positive slope.

23. The method of claim 14, wherein a clock signal is coupled to an optical source generating said optical pulse and to a modulator driver of a modulator for synchronization.

24. The method of claim 14, wherein an electronic clock signal is recovered from the optical pulse and a harmonic of said electronic clock is used to drive said modulation.

25. An apparatus for characterizing an optical pulse, comprising:
a waveguide interferometer for splitting said optical pulse into two replicas separated by a delay;

at least one waveguide temporal phase modulator for modulating at least one of said replicas; and a frequency-resolving device for measuring a spectrum of said modulated replicas;

wherein said at least one replica is modulated with a linear temporal phase modulation.

26. The apparatus of claim 25, further comprising a control unit for characterizing said optical pulse using said measured spectra.

27. The apparatus of claim 26, wherein said control unit characterizes said optical pulse from the measured spectrum using Fourier Transform Spectral Interferometry.

28. The apparatus of claim 26, wherein said control unit performs the calibration of the linear spectral phase attributable to the delay between the two replicas.

29. The apparatus of claim 25, wherein said waveguide interferometer and said at least one waveguide temporal phase modulator are integrated such that a waveguide delay line consists of two arms for splitting said optical pulse into said two replicas and at least one of said arms comprises an integrated waveguide temporal phase modulator.

30. The apparatus of claim 29, wherein each of said two arms comprises an integrated waveguide temporal phase modulator for modulating said two replicas.

31. The apparatus of claim 25, wherein said at least one waveguide temporal modulator comprises a $LiNbO_3$ temporal phase modulator.

32. The apparatus of claim 25, wherein said waveguide interferometer comprises a Mach-Zehnder interferometer.

33. The apparatus of claim 25, wherein said frequency-resolving device comprises an optical spectrum analyzer.

34. The apparatus of claim 25, wherein said frequency-resolving device comprises a Fabry-Perot etalon followed by a photodetector.

* * * * *